(12) United States Patent
Mares et al.

(10) Patent No.: US 11,853,243 B2
(45) Date of Patent: Dec. 26, 2023

(54) CAPACITIVELY-COUPLED MULTI-DOMAIN DISTRIBUTED DRIVER

(71) Applicant: SEMICONDUCTOR COMPONENTS INDUSTRIES, LLC, Phoenix, AZ (US)

(72) Inventors: Pavel Mares, Rajhrad (CZ); Jan Plojhar, Mokra Horakov (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 120 days.

(21) Appl. No.: 17/519,782

(22) Filed: Nov. 5, 2021

(65) Prior Publication Data

US 2023/0140878 A1 May 11, 2023

(51) Int. Cl.
*G06F 13/40* (2006.01)
*H04L 12/40* (2006.01)
*B60R 16/02* (2006.01)
*G06F 13/42* (2006.01)

(52) U.S. Cl.
CPC .......... *G06F 13/4004* (2013.01); *B60R 16/02* (2013.01); *G06F 13/42* (2013.01); *H04L 12/40* (2013.01); *H04L 2012/40273* (2013.01)

(58) Field of Classification Search
CPC .............................. G06F 13/42; G06F 13/4004
See application file for complete search history.

(56) References Cited

U.S. PATENT DOCUMENTS

| | | | | |
|---|---|---|---|---|
| 7,888,969 B2* | 2/2011 | Metzner | ................... | H04B 3/06 326/86 |
| 10,892,759 B1* | 1/2021 | Lee | ......................... | H04L 12/40 |
| 2015/0145563 A1* | 5/2015 | Pardoen | .............. | G06F 13/4072 327/108 |
| 2023/0011275 A1* | 1/2023 | Roeper | .............. | H03K 19/0963 |

OTHER PUBLICATIONS

B. Deutschmann, T. Ostermann, "CMOS output drivers with reduced ground bounce and electromagnetic emission," IEEE 0-7803-8108-4/03, 2003, pp. 537-540.

(Continued)

*Primary Examiner* — Brian T Misiura
(74) *Attorney, Agent, or Firm* — Ramey LLP

(57) ABSTRACT

Capacitive coupling may enable more tightly synchronized operation of components in a multi-domain distributed driver that provides slope-controlled switching of differential signal lines. One illustrative distributed driver includes: a first set of transistors each coupled to drive a first bus line; a first set of delay elements configured to enable and disable the first set of transistors sequentially; a second set of transistors each coupled to drive a second bus line; a second set of delay elements configured to enable and disable the second set of transistors sequentially; and at least one capacitance coupling a first node in the first set of delay elements to a corresponding second node in the second set of delay elements to synchronize signal transitions at the first and second nodes.

22 Claims, 4 Drawing Sheets

(56) References Cited

OTHER PUBLICATIONS

M. Deloge, A. van der Wel, S. Goyal, G. Kwakernaat and A. Schoof, "A highly-digitized automotive CAN transceiver in 0.14μm high-voltage SOI CMOS," 2015 10th International Workshop on the Electromagnetic Compatibility of Integrated Circuits (EMC Compo), 2015, pp. 13-17, doi: 10.1109/EMCCompo.2015.7358322.

Rajesh Garg, Gangandeep Mallarapu, Sunil P. Khatri, "A Single-supply True Voltage Level Shifter," 978-3-9810801-3-1/DATE08 © 2008 EDAA, pp. 979-984.

CAN bus, Wikipedia, Retrieved from https://en.wikipedia.org/w/index.php?title=CAN_bus&oldid=1040809476, Aug. 26, 2021, 15 pages.

* cited by examiner

CAPACITIVELY-COUPLED MULTI-DOMAIN DISTRIBUTED DRIVER

BACKGROUND

Vehicle manufacturers employ multiple electronic control units (ECU) to control various aspects of a vehicle's operation. Often, these ECUs must operate cooperatively to provide desirable operating features such as, e.g., cruise control, power windows, power mirrors, antilock braking, park assist, and autonomous driving. The ECUs may be interconnected by a communications bus such as, e.g., a controller area network (CAN) bus. The wire runs associated with such busses can make them vulnerable to, and prone to causing, electromagnetic interference. The various design standards relating to the CAN bus and other automotive networks accordingly provide features to minimize such interference, but as data rates increase to around and above 1 Mbps the existing features may fail to provide adequate protection against it.

SUMMARY

The problems identified above may be addressed at least in part by a capacitively-coupled multi-domain distributed driver which may enable more tightly synchronized slope-controlled switching of differential signal lines. One illustrative distributed driver includes: a first set of transistors each coupled to drive a first bus line; a first set of delay elements configured to enable and disable the first set of transistors sequentially; a second set of transistors each coupled to drive a second bus line; a second set of delay elements configured to enable and disable the second set of transistors sequentially; and at least one capacitance coupling a first node in the first set of delay elements to a corresponding second node in the second set of delay elements to synchronize signal transitions at the first and second nodes.

An illustrative method includes: driving a first bus line with a first set of transistors; switching the first set of transistors sequentially using a first set of delay elements; driving a second bus line with a second set of transistors; switching the second set of transistors sequentially using a second set of delay elements; and using capacitive coupling between corresponding nodes of the first and second sets of delay elements to synchronize switching of the first and second sets of transistors.

Another illustrative bus driver includes: a first current source configured to supply a drive current to a first bus line via a first gating transistor; a second current source configured to sink a drive current from a second bus line via a second gating transistor; a first buffer that couples a first gate signal from a first node to the first gating transistor; a second buffer that couples a second gate signal from a second node to the second gating transistor; and a capacitance between the first and second nodes to synchronize transitions in the first and second gate signals.

The foregoing drivers and method may be implemented concurrently or independently, along with any suitable combination of the following optional features: 1. the first node is a first intermediate signal line connecting delay elements in the first set of delay elements in series, and the second node is an intermediate signal line connecting delay elements in the second set of delay elements in series. 2. the delay elements in the first and second sets of delay elements each comprise a pair of inverters with an intermediate signal line. 3. each intermediate signal line of each delay element in the first set is capacitively coupled to the intermediate signal line of a corresponding delay element in the second set. 4. the first set of transistors drives the first bus line between two voltages in a first voltage domain and the second set of transistors drives the second bus line between two voltages in a second voltage domain. 5. a transmit data signal is coupled to a first level shifter that shifts the transmit data signal into the first voltage domain for the first set of delay elements. 6. the transmit data signal is coupled to a second level shifter that shifts the transmit data signal into the second voltage domain for the second set of delay elements. 7. the transistors in the first set of transistors are each coupled to drive the first bus line using a respective current source and the transistors in the second set of transistors are each coupled to drive the second bus line using a respective current source. 8. the first and second bus lines are part of a controller area network (CAN) bus that conveys the transmit data signal at 1 Mbps. 9. the first node is an intermediate signal line connecting inverters in series in a first delay element and the second node is an intermediate signal line connecting inverters in series in a second delay element. 10. the first gating transistor is one of multiple gating transistors coupling current sources to the first bus line, and the first delay element is one of multiple delay elements that cause the multiple gating transistors to switch sequentially. 11. each of the multiple delay elements for controlling the gating transistors coupling current sources to the first bus line is capacitively coupled to a respective delay element for controlling gating transistors that couple current sources to the second bus line, the capacitive coupling serving to synchronize signal transitions of corresponding delay elements. 12. a first level shifter that shifts a transmit data signal to a first voltage domain for the first gating transistor. 13. a second level shifter that shifts the transmit data signal to a second voltage domain for the second gating transistor. 14. the first and second level shifters are capacitively coupled to synchronize their signal transitions.

DETAILED DESCRIPTION

It should be understood that the following description and accompanying drawings are provided for explanatory purposes, not to limit the disclosure. In other words, they provide the foundation for one of ordinary skill in the art to understand all modifications, equivalents, and alternatives falling within the scope of the claims.

Figure 1:
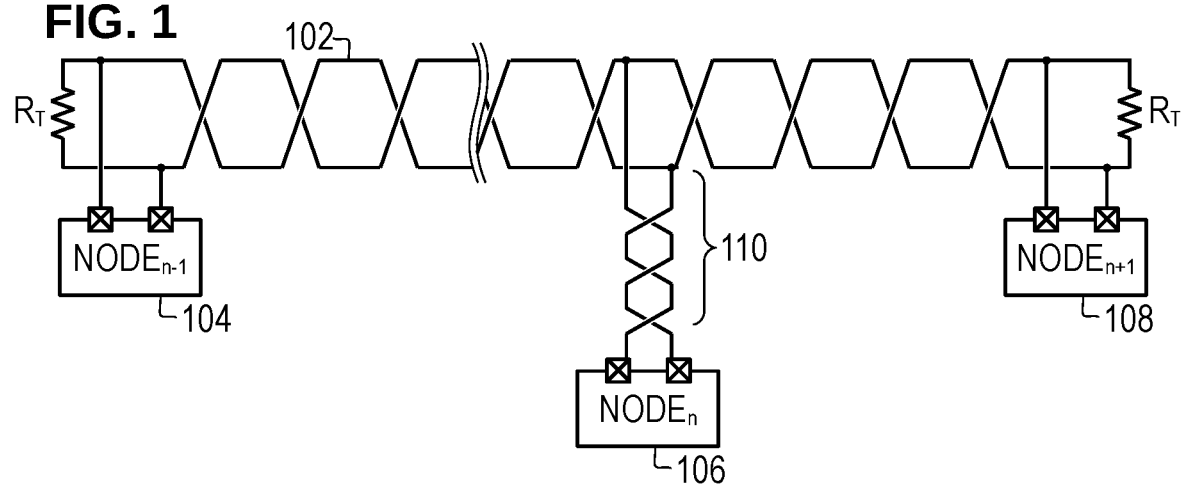
FIG. 1 is a schematic of an illustrative communications bus.

FIG. 1 is a schematic of an illustrative communications bus suitable for communications between electronic control units in a vehicle. The bus includes a twisted wire pair 102 with a termination resistor $R_T$ at each end. Multiple nodes 104, 106, 108, connect to the two conductors of the twisted wire pair directly or via a short stub connection 110. Each node (including the sending node) monitors the bus for transmissions from the other nodes, and transmits to the other nodes pursuant to a predetermined bus protocol such as the controller area network (CAN) bus protocol. Where the CAN protocol is used, the nodes transmit bits by appropriately driving the bus with a current that generates a voltage across the termination resistors or isolating the bus to enable the voltage across the termination resistors to return to zero.

Figure 2:
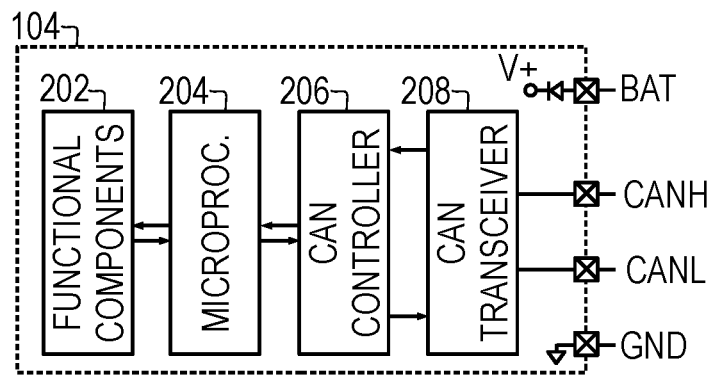
FIG. 2 is a function block diagram of an illustrative electronic control unit.

FIG. 2 is a function block diagram of an illustrative electronic control unit (ECU) that may form one of the illustrative bus nodes 104. Functional components 202 operate actuators, sensors, memory, or other elements that provide the desired function of the bus node 104. Examples include power windows, power locks, power mirrors, cruise control, instrument panel, engine control. An embedded microprocessor or controller 204 controls the state and operating parameters of the functional components in response to signals from user controls and/or to messages received via the bus. A bus controller 206 provides an interface between the microprocessor 204 and the bus, using one or more bus transceivers 208 to send and receive messages via the bus.

The illustrative bus node of FIG. 2 is shown with four terminals including a battery terminal and ground for receiving electrical power for the various ECU components. The other two terminals (CANH, CANL) connect the transceiver to the bus to send and receive differential signals. The transceiver includes both a transmitter and receiver, further details of which can be found in the relevant standard for the desired bus protocol. The present disclosure focuses on novel implementation details for the transmitter.

Figure 3:
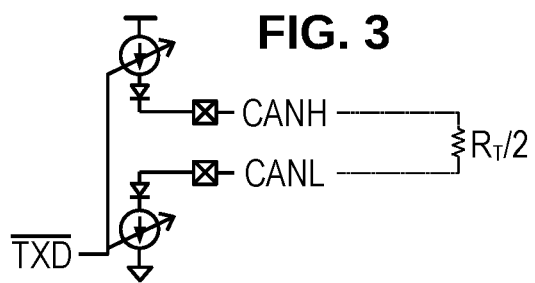
FIG. 3 is a simplified schematic of an illustrative bus driver.

FIG. 3 is a simplified schematic of an illustrative bus driver that may be used by the transmitter to drive the bus with a transmit data stream TXD. A current source is coupled to supply a current to a first bus terminal CANH and a current source is coupled to sink a current from the second bus terminal CANL. The current sources are concurrently enabled and disabled to modulate the voltage drop across the termination resistance, thereby representing the zeros and ones in the binary transmit data stream. When enabled ("dominant state"), the current sources create a differential voltage greater than 1.5 V at the transmitter (greater than 0.9 V at the receiver) to represent a zero. When the current sources are disabled ("recessive state"), the differential voltage across the termination resistance falls below 0.5 V to represent a one. This high impedance state of the driver, and more particularly, transitions to and from this high impedance state, may present some difficulties with keeping the currents sufficiently balanced to prevent variation of the common mode.

Figure 4A:
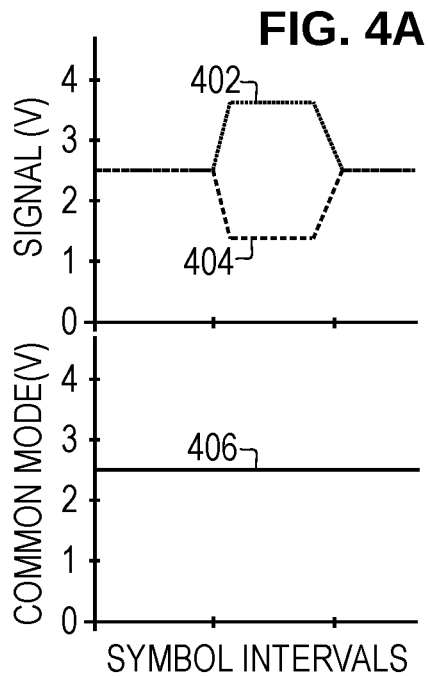
FIG. 4A is a graph of idealized differential and common mode signals.

FIG. 4A is a graph of idealized differential and common mode signals. Signal 402 represents the CANH terminal voltage, signal 404 represents the CANL terminal voltage, and signal 406 represents the common mode voltage (CANH+CANL)/2. After an initial interval where the bus lines are isolated and constant at about 2.5 V, the CANH terminal voltage increases to about 3.5 V while the CANL terminal voltage drops to about 1.5 V, creating a differential voltage of about 2 V for the length of the second interval. Thereafter, the terminal voltages return to about 2.5 V. Ideally, the terminal voltages are synchronized both in time and slope to maintain a constant 2.5 V common mode voltage throughout.

Figure 4B:
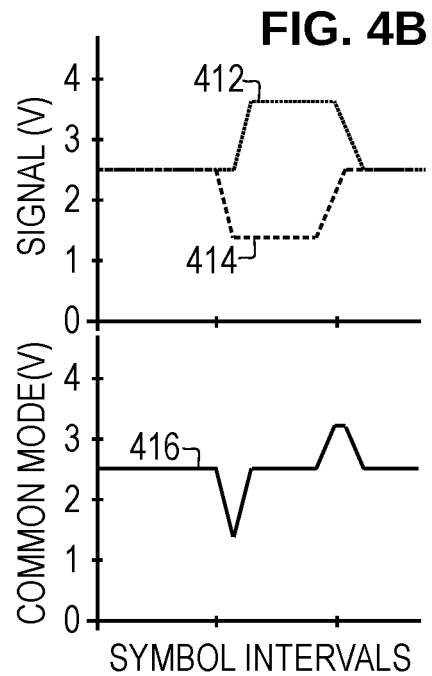
FIG. 4B is a graph of unsynchronized differential and common mode signals.

FIG. 4B is a graph of unsynchronized differential and common mode signals. Signal 412 represents the CANH terminal voltage, signal 414 represents the CANL terminal voltage, and signal 416 represents the common mode voltage. Asynchronous transitions in the terminal voltages produce spikes in the common mode voltage. Notably, the spikes create currents in the ground line and/or supply voltage lines, creating electromagnetic interference for other components and systems of the vehicle.

At high bit rates, this interference can be substantial if the differential signal transitions are not carefully synchronized. Even timing differences due to small manufacturing process variations between transistors can be sufficient to create undesirable levels of interference.

Figure 5:
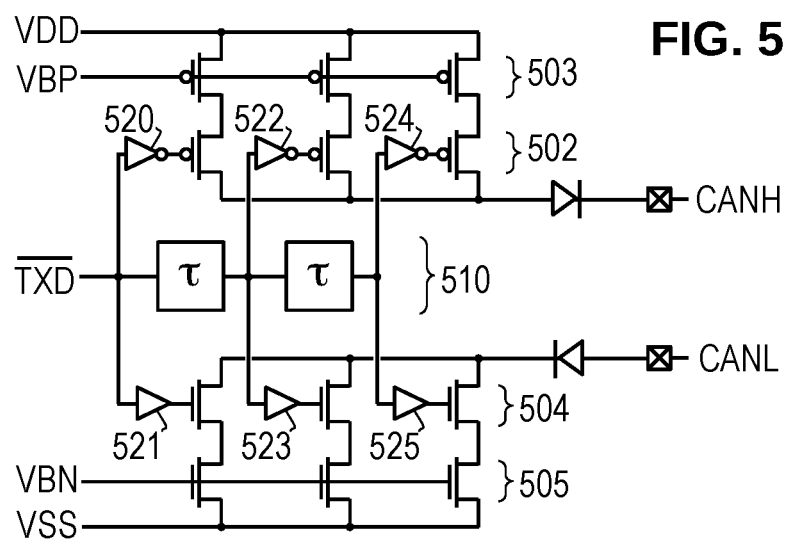
FIG. 5 is a schematic of an illustrative distributed driver.

One way to at least partly address this issue is to make the signal transitions more gradual to limit the amplitude of any voltage differences created by small timing mismatches. While this approach is limited by the need for fast signal transitions required by high data rate systems, at least some improvement is achievable. FIG. 5 is a schematic of an illustrative distributed driver that makes transitions more gradual by turning on a series of current sources in sequence.

The distributed driver of FIG. 5 has a set of transistors 502 that each couple a respective current source 503 to the CANH bus line. The illustrated transistors 502 are p-type MOSFETs and current sources 503 are p-type MOSFETs biased with a gate voltage $V_{BP}$ which may be generated using a current mirror configuration. In some implementations, the current sources have different sizes to drive different amplitudes of current from the shared bias voltage.

Similarly, a second set of transistors 504 each couple a respective current source 505 to sink current from the CANL bus line. The illustrated transistors 504 are n-type MOSFETs and current sources 505 are n-type MOSFETs biased with a gate voltage $V_{BN}$ which may be generated using a current mirror configuration. Transistors 502 and sources 503 are matched as closely as possible to transistors 504 and sources 505 to provide balanced current flows to and from the differential bus lines.

The timing of transitions on the bus lines is controlled by a delay chain 510. The binary TXD signal is slightly delayed by a first delay element. A second delay element in the chain 510 slightly delays the delayed TXD signal, providing a twice-delayed TXD signal. Additional delay elements may be included to provide further-delayed versions of the TXD signal. Each delay may be kept to a small fraction of the symbol interval to ensure that full switching occurs and signal transitions are completed within, say, 10% of the symbol interval. Thus, for a 1 microsecond symbol interval (used for 1 MHz symbol rate), the delay elements in one example may each provide 2.5 nanoseconds of delay.

The binary TXD signal is supplied to an inverter 520 which drives a first of the gating transistors 502, and is further supplied to a buffer 521 which drives a first of the second set of gating transistors 504. When the signal transitions low to high, the first gating transistors enable the first of the current sources in each set 503, 505 to start driving the bus lines. The once-delayed TXD signal is supplied to inverter 522 and buffer 523 to drive the gates of the second gating transistors, enabling the second current source in each set 503, 505 to join the first current sources in driving the bus lines. The twice-delayed TXD signal is supplied to inverter 524 and buffer 525 to drive the gates of the third gating transistors, subsequently enabling the third of the current sources in each set 503, 505 to join the previous current sources in driving the bus lines. If desired, additional stages can be provided. The total current source to bus line CANH and sunk from bus line CANL thus increases in a stepped fashion, cooperating with the capacitance of the bus lines to provide a gradual voltage transition.

As the binary TXD signal transitions from low (dominant) to high (recessive), the gating transistors sequentially disable the current sources in each set, decreasing the drive current in a stepped fashion and thereby providing a smoothed voltage transition. The delay chain 510 provides tight control of the timing that, together with proper matching of the transistors, facilitates synchronization of the bus line voltage transitions.

However, the distributed driver of FIG. 5 has a potential implementation issue in that the manufacturing processes for fast, low-power electronics provide low voltage transistors not suitable for controlling the full voltage swing of a standard-compliant CAN bus. Multi-domain drivers have been developed to address this issue in part by separating the transistors that control the swing of one bus line from the transistors that control the voltage swing of the other bus line. With this separation, the difference in supply voltages for the transistors in each domain can be reduced.

Figure 6:
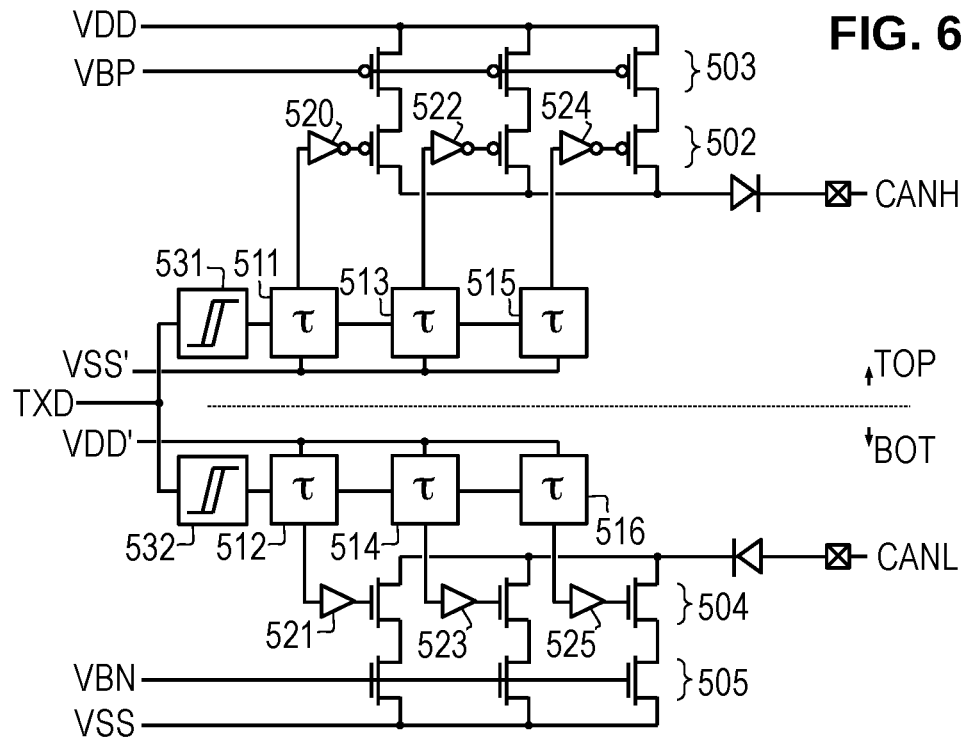
FIG. 6 is a schematic of an illustrative multi-domain distributed driver.

FIG. 6 is a schematic of an illustrative multi-domain distributed driver. The supply voltages for the top voltage domain may be, e.g., 4.8 V for $V_{DD}$ and 2.4 V for $V_{SS}'$. For the bottom voltage domain, the supply voltages may be, e.g., 2.4 V for $V_{DD}'$ and 0 for $V_{SS}$. A first level shifter 531 translates the TXD signal into a binary signal in the top voltage domain where delay elements 511, 513, and 515 form a first delay chain. A second level shifter 532 translates the TXD signal into a binary signal in the bottom voltage domain where delay elements 512, 514, and 516 form a second delay chain. Even when the delay chains are made with matched components, the authors have found that the two delay chains create timing mismatches with consequent common mode variations that may create unacceptable levels of electromagnetic interference.

Figure 7:
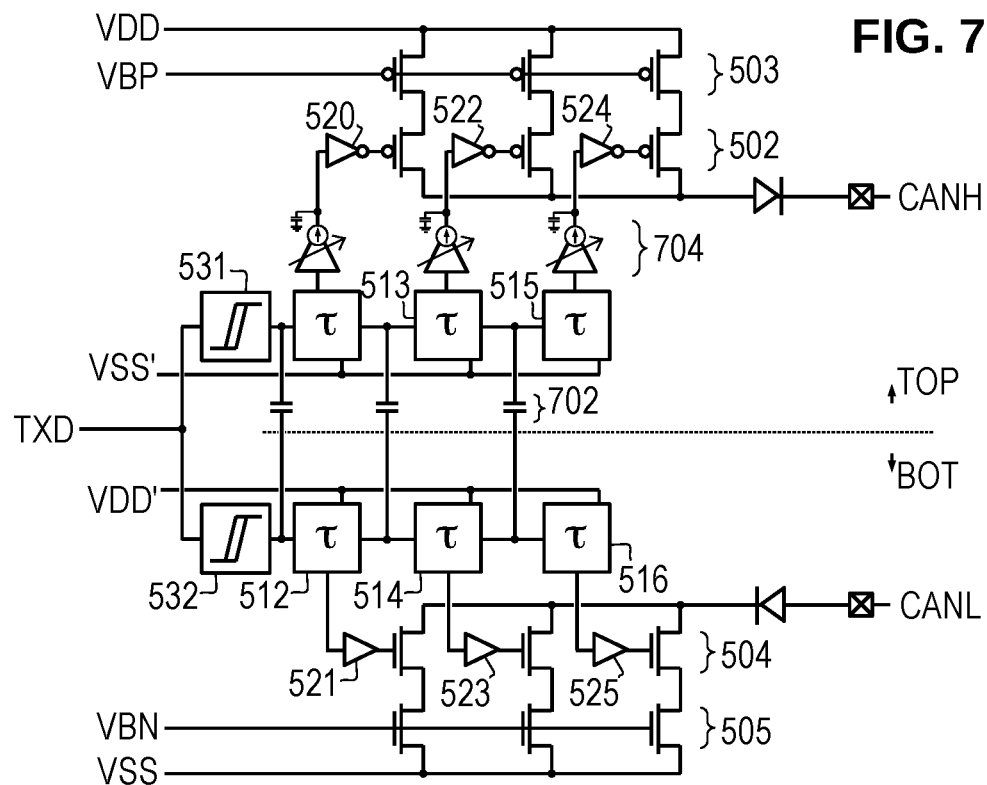
FIG. 7 is a schematic of an illustrative capacitively-coupled multi-domain distributed driver.

To more tightly control the timing of the delay chains, coupling capacitors 702 may be used as shown in FIG. 7. The two delay chains have corresponding signal nodes that should be exhibiting simultaneous signal transitions. When such nodes are capacitively coupled, a signal transition on one node is conveyed to the other node and vice versa. This cross-communication between the delay chains essentially eliminates any timing mismatches. Even small capacitance values on the order of 3 to 10 fF may be sufficient to achieve the desired delay chain synchronization. Such values may be advantageously achieved by routing the relevant traces in close proximity to create a parasitic capacitance. Such parasitic capacitance design obviates any need for discrete capacitors and their associated areal requirements.

FIG. 7 also shows an adjustable delay buffer 704 connecting each delay element 511, 513, 515, to the corresponding inverter 520, 522, 524. The authors have observed a systematic difference in signal propagation delay for complementary PMOS/NMOS devices. These delay buffers 704 may be used to compensate for this difference. The delay buffers 704 are adjustable and may be controlled in an adaptive fashion by control circuitry to optimize such compensation.

Figure 8:
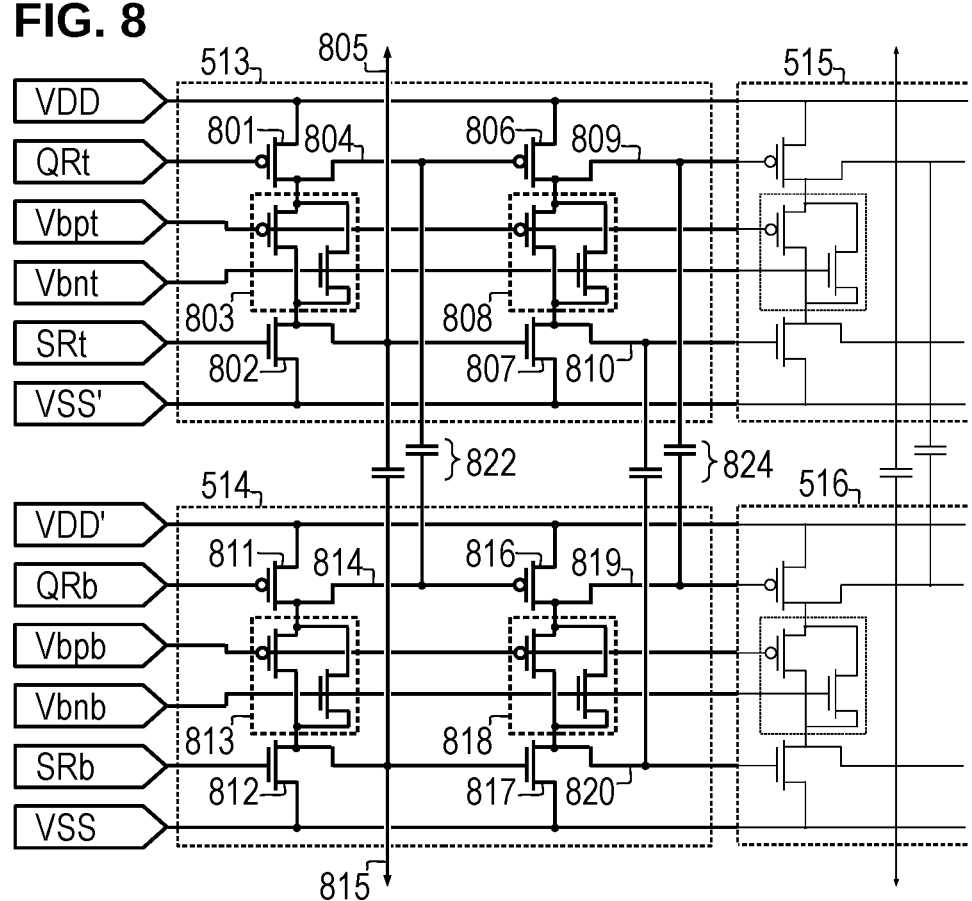
FIG. 8 is a schematic of illustrative capacitively-coupled delay elements.

FIG. 8 shows additional detail for one illustrative implementation of the capacitively-coupled delay elements in the delay chains. In the figure, delay element 513 includes a first inverter stage formed by elements 801-803 and a second inverter stage formed by elements 806-808, both operating in the top voltage domain. A p-type MOSFET 801 couples a power supply voltage $V_{DD}$ to signal node 804, while an n-type MOSFET 802 couples a second power supply voltage $V_{SS}'$ to signal node 805. A current source 803, formed by a Vbpt-biased p-type MOSFET in parallel with a Vbnt-biased n-type MOSFET, conveys current from signal node 805 to signal node 805. The bias voltages may be generated using a current mirror configuration.

The current source 803 causes signal node 805 to follow signal node 804 when transistor 801 is ON and transistor 802 is OFF, producing a "slow rise" waveform on signal node 805 due to the signal node capacitance and the limited current flow. (The slow rise waveform falls quickly when transistor 802 turns ON, and may consequently be called slow-rise-quick-fall or just abbreviated "SR" herein.) Conversely, current source 803 causes signal node 804 to follow signal node 805 when transistor 801 is OFF and transistor 802 is ON, producing a quick-rise-slow-fall ("QR") waveform on signal node 804. These "slow" signal transitions delay the switching of transistors 806, 807 in the second inverter stage, which similarly employs a current source 808 to slow the transitions on signal nodes 809, 810 connected to the subsequent delay element 515.

We note here that the delay chain's first delay element 511 may have the QRt and SRt input terminals both connected to the output of the level shifter 531. In the bottom voltage domain, delay element 512 can be similarly configured with the QRb and SRb input terminals both connected to the output of the level shifter 532. The operation of elements 811-820 in the bottom voltage domain delay element 514 corresponds to the already-described operation of elements 801-810.

Capacitances 822 couple signal node 804 in the top voltage domain to corresponding signal node 814 in the bottom voltage domain as well as coupling corresponding signal nodes 805, 815. Corresponding signal nodes 809, 819 and 810, 820 are coupled by capacitances 824. Signal nodes 805, 815 may be used to control the gating transistors described previously.

Figure 9:
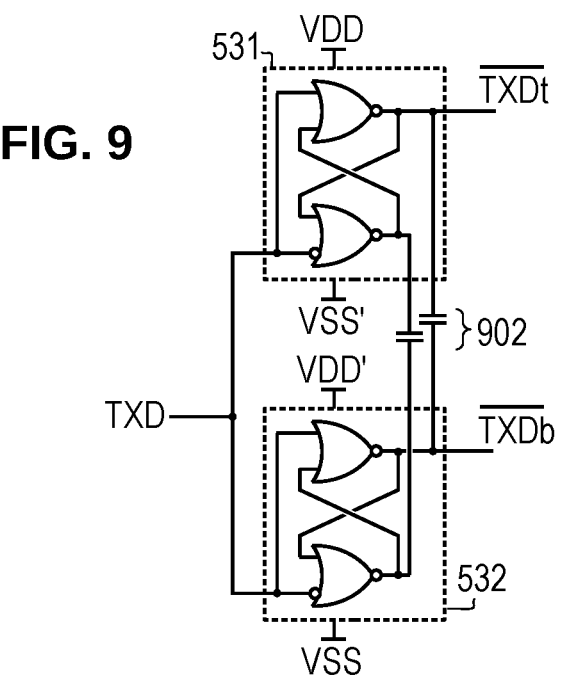
FIG. 9 is a schematic of illustrative capacitively-coupled level shifters.

Depending on the implementation of the level shifters, capacitive coupling may also be employed there to further assist signal synchronization in the top and bottom voltage domains. In the illustrative implementation of FIG. 9, the level shifters 531, 532 are implemented using logical NOR gates cross connected in an SR flip flop configuration. Capacitances 902 are provided between the corresponding signal nodes of the flip-flops.

Numerous other modifications, equivalents, and alternatives, will become apparent to those of ordinary skill in the art once the above disclosure is fully appreciated. For example, the foregoing description often refers to the CAN bus protocol, but the disclosed principles are equally applicable to synchronizing multidomain delay lines in other contexts. It is intended that the following claims be interpreted to embrace all such modifications, equivalents, and alternatives where applicable.

What is claimed is:
1. A distributed driver that comprises:
a first set of transistors each configured to drive a first bus line;
a first set of delay elements configured to enable and disable the first set of transistors sequentially;
a second set of transistors each configured to drive a second bus line; and a second set of delay elements configured to enable and disable the second set of transistors sequentially;

wherein a first node in the first set of delay elements is capacitively coupled to a corresponding second node in the second set of delay elements to synchronize signal transitions at the first and second nodes.

2. The distributed driver of claim 1, wherein the first node is a first intermediate signal line connecting delay elements in the first set of delay elements in series, and the second node is an intermediate signal line connecting delay elements in the second set of delay elements in series.

3. The distributed driver of claim 1, wherein the delay elements in the first and second sets of delay elements each comprise a pair of inverters with an intermediate signal line, wherein each intermediate signal line of each delay element in the first set is capacitively coupled to the intermediate signal line of a corresponding delay element in the second set.

4. The distributed driver of claim 1, wherein the first set of transistors is configured to drive the first bus line between two voltages in a first voltage domain and the second set of transistors is configured to drive the second bus line between two voltages in a second voltage domain.

5. The distributed driver of claim 4, wherein a transmit data signal is coupled to a first level shifter configured to shift the transmit data signal into the first voltage domain for the first set of delay elements.

6. The distributed driver of claim 5, wherein the transmit data signal is coupled to a second level shifter configured to shift the transmit data signal into the second voltage domain for the second set of delay elements.

7. The distributed driver of claim 1, wherein the transistors in the first set of transistors are each configured to drive the first bus line using a respective current source and the transistors in the second set of transistors are each configured to drive the second bus line using a respective current source.

8. The distributed driver of claim 1, wherein the first and second bus lines are part of a controller area network (CAN) bus configured to convey a transmit data signal at 1 Mbps.

9. The distributed driver of claim 1, further comprising a set of adjustable delay buffers each configured to couple a respective delay element of the first set of delay elements to a respective one of the first set of transistors and each configured to provide an adaptive delay to compensate for a signal propagation delay difference relative to the second set of transistors.

10. A method that comprises:
driving a first bus line with a first set of transistors;
switching the first set of transistors sequentially using a first set of delay elements;
driving a second bus line with a second set of transistors;
switching the second set of transistors sequentially using a second set of delay elements; and
using capacitive coupling between corresponding nodes of the first and second sets of delay elements to synchronize switching of the first and second sets of transistors.

11. The method of claim 10, wherein the delay elements in the first and second sets of delay elements each comprise a pair of inverters with an intermediate signal line, wherein each intermediate signal line of each delay element in the first set is capacitively coupled to the intermediate signal line of a corresponding delay element in the second set.

12. The method of claim 10, wherein the first set of transistors drives the first bus line between two voltages in a first voltage domain and the second set of transistors drives the second bus line between two voltages in a second voltage domain.

13. The method of claim 12, further comprising level shifting a transmit data signal into the first voltage domain for the first set of delay elements.

14. The method of claim 13, further comprising level shifting the transmit data signal into the second voltage domain for the second set of delay elements.

15. The method of claim 10, wherein the transistors in the first set of transistors are each configured to drive the first bus line using a respective current source and the transistors in the second set of transistors are each configured to drive the second bus line using a respective current source.

16. The method of claim 10, further comprising adapting an adjustable delay between each of the delay elements in the first set of delay elements and each of the transistors in the first set of transistors to compensate for a signal propagation delay difference relative to the transistors in the second set of transistors.

17. A bus driver that comprises:
a first current source configured to supply a drive current to a first bus line via a first gating transistor;
a second current source configured to sink a drive current from a second bus line via a second gating transistor;
a first buffer configured to couple a first gate signal from a first node to the first gating transistor; and
a second buffer configured to couple a second gate signal from a second node to the second gating transistor;
wherein the first and second nodes are capacitively coupled to each other to synchronize transitions in the first and second gate signals.

18. The bus driver of claim 17, wherein the first node is an intermediate signal line connecting inverters in series in a first delay element and the second node is an intermediate signal line connecting inverters in series in a second delay element.

19. The bus driver of claim 18, wherein the first gating transistor is one of multiple gating transistors coupling current sources to the first bus line, and the first delay element is one of multiple delay elements configured to cause the multiple gating transistors to switch sequentially.

20. The bus driver of claim 19, wherein each of the multiple delay elements for controlling the gating transistors coupling current sources to the first bus line is capacitively coupled to a respective delay element for controlling gating transistors that couple current sources to the second bus line, the capacitive coupling serving to synchronize signal transitions of corresponding delay elements.

21. The bus driver of claim 17, further comprising a first level shifter configured to shift a transmit data signal to a first voltage domain for the first gating transistor.

22. The bus driver of claim 21, further comprising a second level shifter configured to shift the transmit data signal to a second voltage domain for the second gating transistor, wherein the first level shifter and the second level shifter are capacitively coupled to each other to synchronize their signal transitions.

* * * * *